UNITED STATES PATENT OFFICE.

JULIUS ROBERT HERMANN ADOLF LÄMMERHIRT, OF HOERDE, GERMANY.

METHOD OF BRIQUETING FINELY-PULVERIZED IRON ORE.

1,315,315.   Specification of Letters Patent.   Patented Sept. 9, 1919.

No Drawing.   Application filed July 6, 1917.   Serial No. 179,015.

*To all whom it may concern:*

Be it known that I, JULIUS ROBERT HERMANN ADOLF LÄMMERHIRT, a subject of the German Emperor, and resident of Hoerde, Germany, have invented a new and useful Method of Briqueting Finely-Pulverized Iron Ore, of which the following is a specification.

The method of briqueting finely pulverized iron ores by aid of an admixture of metallic iron in fine pieces or finely pulverized, in particular iron shavings, in the presence of water, and with or without an admixture of soluble salts and acids, will fail with materials consisting of ferroso-ferric oxid, such as iron scales, and the pulverulent concentrates of magnetic iron ore obtained by magnetic ore dressing. As these materials have in recent times gained a high importance for iron metallurgic industries, it is important to provide a simple briqueting method applicable to the same.

It has been found that if finely pulverulent ferric oxids or hydroxids are added in comparatively small quantities to such concentrate, and iron shavings added, the mass may be briqueted, in an excellent manner. The respective admixture depends on the character of the ferric oxid or the hydroxigenous fine ore.

The result is based on the fact that the ferric oxids and hydroxids react chemically with iron shavings or finely divided iron. It is supposed that there is a relative action between the metallic iron and the oxid in such a sense that a part of the oxygen in the latter participates in the oxidation of the metallic iron, the ore being thereby reduced, so that the particles of fine ore are cemented together and to the iron shavings or the product of their oxidation, respectively.

If the iron oxid is of a plastic character, as when used in a moist or wet state, or with the addition of water, this will further contribute toward cementing the ingredients together.

The relative action between the metallic iron and the iron hydroxid or the ferric oxid in the presence of water will appear during the ordinary compression, without any acid having to be added and without the briquets having to be heated. Therefore no special additions to and no special treatment of the briquets are required.

I claim:

1. The method of briqueting ferroso-ferric materials, in particular iron scales and the pulverulent concentrates obtained from magnetic iron ore by the magnetic dressing process, which consists in adding metallic iron in fine pieces, and adding moist ore containing ferric oxid or oxyhydrates.

2. The method of briqueting ferroso-ferric materials, in particular iron scales and the pulverulent concentrates obtained from magnetic iron ore by the magnetic dressing process, which consists in adding metallic iron in fine pieces, and adding ore containing ferric oxid or oxyhydrates and water.

3. The method of briqueting ferroso-ferric materials, in particular iron scales and the pulverulent concentrates obtained from magnetic iron ore by the magnetic dressing process, which consists in adding iron shavings and adding moist ore containing ferric oxid or oxyhydrates.

In testimony that I claim the foregoing as my invention, I have signed my name in presence of two witnesses, this 23d day of May, 1917.

JULIUS ROBERT HERMANN
ADOLF LÄMMERHIRT.

Witnesses:
CARL ROTH,
WILHELM DORME.

Copies of this patent may be obtained for five cents each, by addressing the "Commissioner of Patents, Washington, D. C."